US006866135B2

(12) United States Patent
Quadracci et al.

(10) Patent No.: US 6,866,135 B2
(45) Date of Patent: Mar. 15, 2005

(54) CONVEYOR WASTE GATE (75) Inventors: David T. Quadracci, Brookfield, WI (US); Eric L. Kuhne, New Berlin, WI (US); Jeffrey J. Karch, West Bend, WI (US)

(73) Assignee: Quad/Tech, Inc., Sussex, WI (US)

( * ) Notice: Subject to any disclaimer, the term of this patent is extended or adjusted under 35 U.S.C. 154(b) by 49 days.

(21) Appl. No.: 10/375,979

(22) Filed: Feb. 28, 2003

(65) Prior Publication Data

US 2004/0168886 A1 Sep. 2, 2004

(51) Int. Cl.[7] .............................................. B65G 47/46
(52) U.S. Cl. ..................... 198/369.7; 198/361; 198/812
(58) Field of Search .............................. 198/369.7, 361, 198/539, 812; 271/184, 225

(56) References Cited

U.S. PATENT DOCUMENTS

| 2,361,267 | A |   | 10/1944 | Clifford |   |
|---|---|---|---|---|---|
| 3,214,002 | A |   | 10/1965 | Kirkpatrick et al. |   |
| 3,332,819 | A |   | 7/1967 | Siempelkamp |   |
| 3,464,537 | A |   | 9/1969 | Thull |   |
| 4,018,326 | A | * | 4/1977 | Hardy | 198/418.9 |
| 4,033,463 | A |   | 7/1977 | Cervin |   |
| 4,429,517 | A |   | 2/1984 | Lohrentz et al. |   |
| 4,720,091 | A |   | 1/1988 | Kobler |   |
| 4,938,336 | A |   | 7/1990 | Aquino et al. |   |
| 5,256,021 | A |   | 10/1993 | Wolf et al. |   |
| 5,421,446 | A |   | 6/1995 | Koch et al. |   |
| 5,433,430 | A |   | 7/1995 | Straessler et al. |   |
| 5,640,833 | A |   | 6/1997 | Gerber |   |
| 5,715,930 | A | * | 2/1998 | Hogenkamp | 198/435 |
| 5,855,368 | A | * | 1/1999 | Middelberg et al. | 271/272 |
| 5,984,078 | A |   | 11/1999 | Bonnet |   |

FOREIGN PATENT DOCUMENTS

DE          4213021 A1  * 10/1993     ........... B65H/29/62

* cited by examiner

Primary Examiner—Eileen D. Lillis
Assistant Examiner—Mark A. Deuble
(74) Attorney, Agent, or Firm—Michael Best & Friedrich LLP (57) ABSTRACT The invention recites a gate that is selectively operable to pass a stream of printed products to one of a first path and a second path. The waste gate includes a frame and a first roller member supported by the frame for rotation about a first axis. The first axis is fixed with respect to the frame. A second roller member is supported by the frame for rotation about a second axis. The second roller is movable with respect to the first roller between a first position and a second position. A conveyor belt is supported by the first roller and the second roller such that when the second roller is in the first position, the stream of printed products pass along the first path and when the second roller is in the second position, the stream of printed products pass along the second path.

44 Claims, 5 Drawing Sheets

CONVEYOR WASTE GATE

BACKGROUND OF THE INVENTION

The present invention relates to a method and apparatus for removing printed product from a passing stream. In particular, the invention relates to a method and apparatus for removing printed product in a stream from a conveyor line.

Many different operations are involved in the bulk production and formation of magazines, newspapers, books, and other print media. These operations may include printing, stuffing or inserting fliers, and binding. These processes are performed at the highest speed possible to optimize the equipment usage and reduce costs. In addition, many of these processes are customized for individual consumers. The high level of customization and the high speed at which the operations are performed make extraction of product difficult. Given the speed and cost of downtime, it is unrealistic to stop the process to allow for the hand removal of the product. In addition, removal during the process is often difficult or impossible.

Printed product is typically delivered from one process step to another in a shingled stream. Thus, removal of printed product containing errors or for quality reasons is possible and convenient between operations rather than during operations.

SUMMARY OF THE PREFERRED EMBODIMENT

The present invention provides a waste gate that is selectively operable to pass a stream of printed products to one of a first path and a second path. The waste gate includes a frame and a first roller member supported by the frame for rotation about a first axis. The first axis is fixed with respect to the frame. A second roller member is supported by the frame for rotation about a second axis. The second axis is movable with respect to the first roller between a first position and a second position. A conveyor belt is supported by the first roller and the second roller such that when the second roller is in the first position, the stream of printed products pass along the first path and when the second roller is in the second position, the stream of printed products pass along the second path.

In another embodiment, the invention provides a waste gate including a frame having an input and an output end and a first roller supported for rotation about a first axis. The first axis is fixed with respect to the frame and positioned adjacent the output end. A second roller member is supported by the frame for rotation about a second axis. The second roller is movable with respect to the first roller between a first position and a second position, the first position being adjacent the input end. A conveyor belt is connected to both the first roller and the second roller.

In another construction, the invention provides a method of diverting a stream of printed products to a waste path. The method includes positioning a frame between an input conveyor and an output conveyor and supporting a conveyor belt between a fixed roller and a movable roller. The fixed roller being rotatable about an axis that is fixed relative to the frame and the movable roller rotatable about an axis that is movable with respect to the first roller between a first position and a second position. The method also includes operating the conveyor belt along a first conveyor path and feeding the stream of printed products from the input conveyor to the conveyor belt and from the conveyor belt to the output conveyor. The method further includes moving the movable roller from the first position to the second position such that the stream of printed products is diverted to a waste path prior to reaching the conveyor belt.

BRIEF DESCRIPTION OF THE DRAWINGS

The detailed description particularly refers to the accompanying figures in which.

DETAILED DESCRIPTION OF THE DRAWINGS

Figure 1:
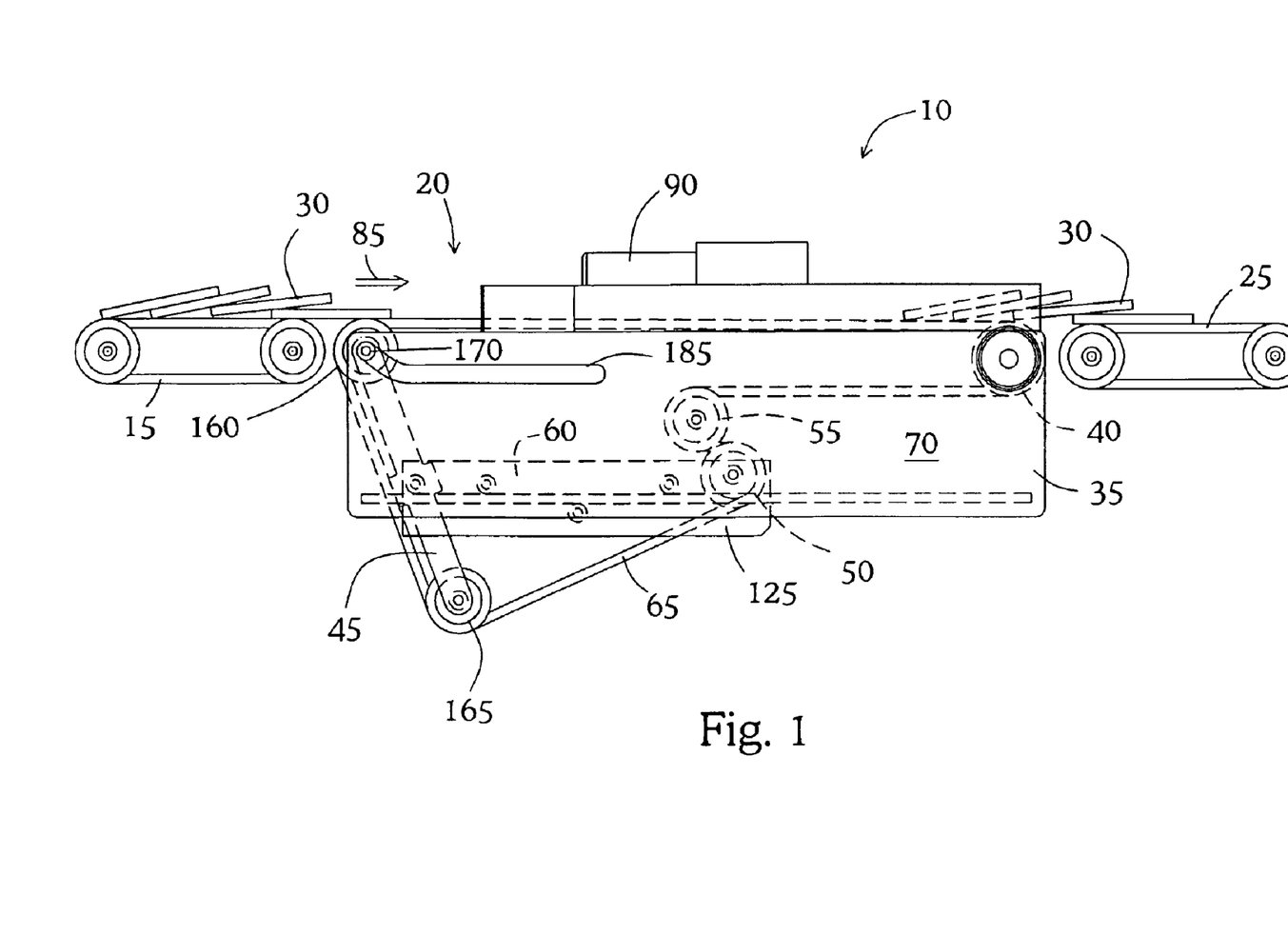
FIG. 1 is a schematic illustration of a conveyor system including a waste gate.

FIG. 1 illustrates a conveyor system 10 including an input conveyor 15, a waste gate 20, and an output conveyor 25. The input conveyor 15 delivers printed product such as signatures 30 to the waste gate 20. Typically, the printed products are oriented in the form of a shingled stream, however, other orientations can also be used. The input conveyor 15 illustrated includes a single belt that supports and delivers the stream of printed products. However, other configurations are possible and contemplated by the present invention. The input conveyor 15, for purposes of the present invention, functions only to deliver printed product to the waste gate 20 and as such its configuration is not important to the present invention. Likewise, the output conveyor 25 is shown schematically as a single belt that is operable to conduct the stream of printed products away from the waste gate 20. Like the input conveyor 15, many different arrangements of the output conveyor 25 are possible and contemplated. The configuration of the output conveyor 25 is unimportant to the operation of the waste gate 20 so long as the output conveyor 25 conducts the stream of printed product away from the waste gate 20.

It should be noted that the invention described herein is well suited to use with any type of printed product. Signatures are one common form of printed product for which the present invention is particularity suited. Thus, for clarity, the invention will henceforth be described in conjunction with signatures. However, this description should not limit the invention to that use alone.

Figure 2:
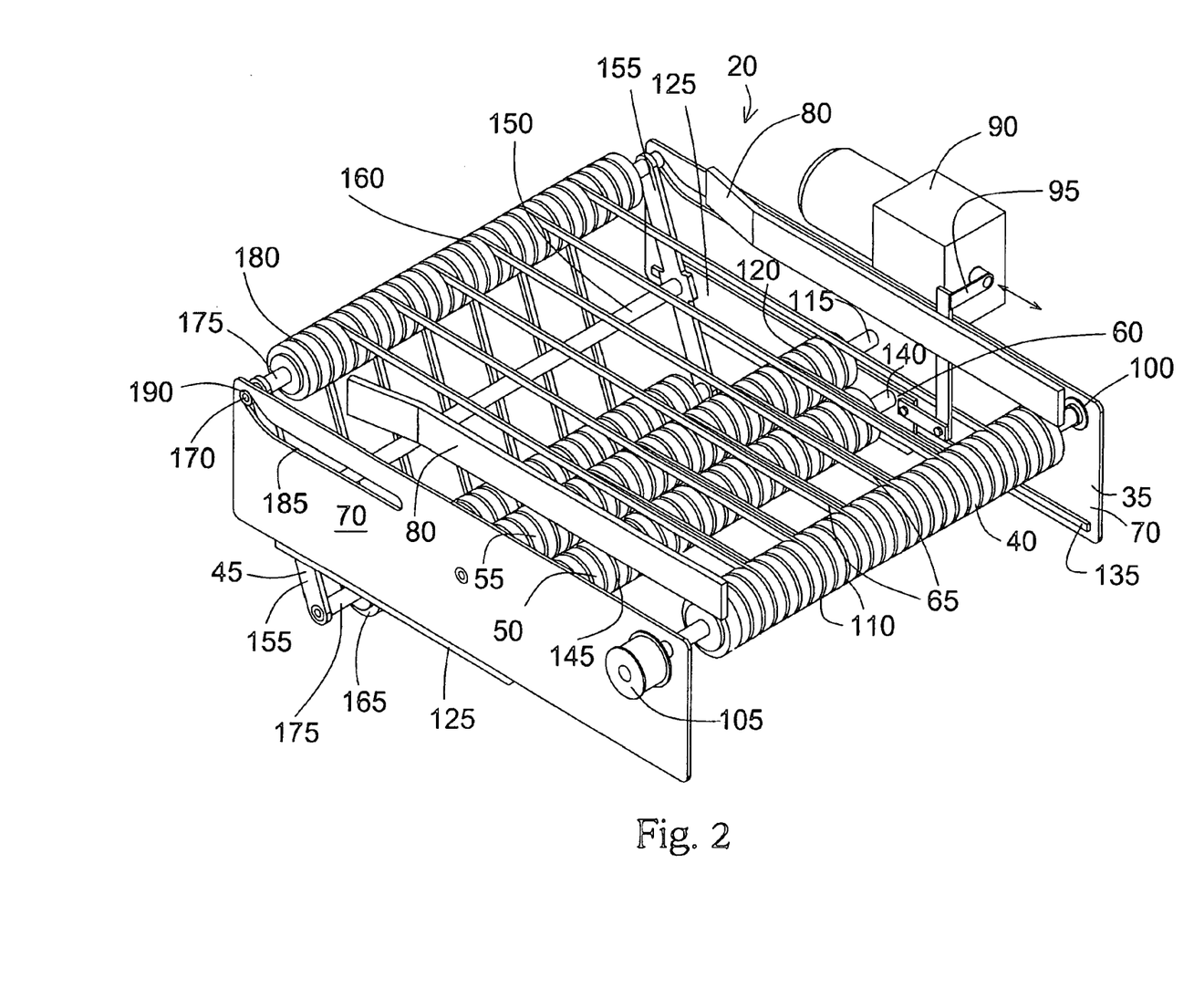
FIG. 2 is a perspective view of the waste gate of FIG. 1.
Figure 3:
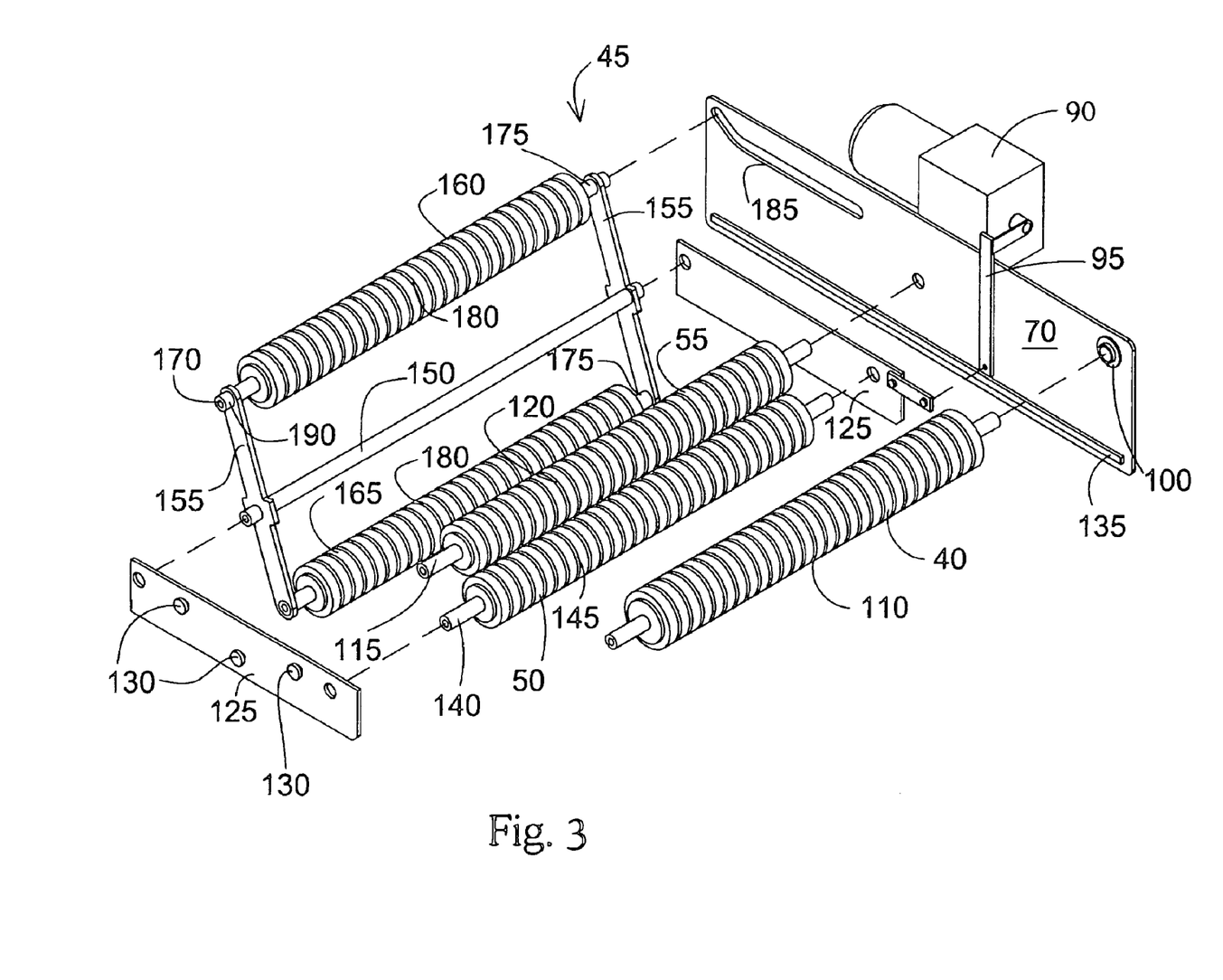
FIG. 3 is a partially exploded perspective view of a portion of the waste gate of FIG. 1.

As shown in FIGS. 2 and 3, the waste gate 20 includes a frame 35, a first roller such as a drive roller 40, a pivot member such as a seesaw member 45, a movable idler roller 50, a stationary idler roller 55, a movable carriage 60, and a plurality of belts 65.

The frame 35, best illustrated in FIG. 2, includes two side plates 70 spaced apart and attached to one another. The drive roller 40, seesaw member 45, and stationery idler roller 55 extend between the side plates 70 to provide the necessary support and spacing. In some constructions, support rods extend between the plates 70 to provide the proper spacing and to support the side plates 70 relative to one another. Each side plate 70 supports a guide member 80 that is positioned to define a path 85 for the stream of signatures through the waste gate 20. The guide members 80 are positioned substantially parallel to the path 85 and act as side walls.

One of the side plates 70 supports an actuator such as the servomotor 90 illustrated in FIGS. 2 and 3. As shown in FIG. 3, the servomotor 90 includes a movable arm 95 connected to the carriage 60. Actuation of the servomotor 90 moves the carriage 60 between a first position (shown in FIGS. 4 and 5) and a second position (shown in FIGS. 6 and 7). While an air-actuated servomotor 90 is illustrated, other actuators (e.g., hydraulic cylinders, motors, stepper motors, etc.) can be utilized. For example, another construction employs a stepper motor that drives a rack and pinion gear set. The motor turns a set number of revolutions to move the rack and the carriage 60 between the first position and the second position. In yet another construction, a motor drives a lead screw through a clutch to move the carriage 60.

In still other constructions, the actuator includes brakes positioned on one or more of the rollers. The brakes are actuatable to stop the motion of the belts 65 and move the carriage 60 from the first position to the second position. The inertia of the signatures 30 arriving at the belts 65 provides the impetus needed to move the carriage 60. A biasing member biases the carriage 60 in the first position. Alternatively, a locking mechanism holds the carriage 60 in the first position until the brakes are actuated. The locking member releases the carriage 60 as the brakes are applied to allow the carriage 60 to move to the second position. Some constructions employ a second locking member that engages and holds the carriage 60 in the second position. The second locking member releases the carriage 60 after a predetermined time interval or in conjunction with the disengagement of the brakes.

Returning to FIG. 2, the drive roller 40 extends between the two side plates 70 and is supported for rotation by bearings 100 attached at either end to the side plates 70. The bearings 100 are pillow-block type bearings with other bearing types also being suitable (e.g., roller, ball, needle, angular contact, etc.). One end of the drive roller 40 extends beyond the side plate 70 and supports a drive pulley 105. A belt (not shown) engages the drive pulley 105 and imparts rotation to rotate the belts 65 and move signatures 30 through the waste gate 20. In another construction, the pulley 105 is supported in the space between the side plates 70, rather than outside of the side plate 70. In still other constructions, the drive roller 40 is driven directly by an electric motor, thereby eliminating the need for a drive pulley 105. In still other constructions, a drive gear that engages another gear or is driven through a gearbox at the desired speed replaces the drive pulley 105. The actual arrangement used to rotate the drive roller 40 can be varied as desired.

The drive roller 40 includes a plurality of grooves 110 that are sized and shaped to receive the plurality of belts 65. Each belt 65 is positioned in any one of the grooves 110 to define a conveyor of the desired width. The use of multiple narrow belts 65 rather than a single wide belt improves the flexibility of the conveyor system and allows for rapid changes in the orientation of the conveyor path without belt slippage or disruption of the printed product passing on the conveyor. However, it should be noted that a smooth drive roller and a single flat belt could also be employed.

The stationary idler roller 55 is positioned between the side plates 70. The stationary idler roller 55 is supported for rotation on a fixed axle 115 that extends between the frame side plates 70. The stationary idler roller 55 includes bearings that facilitate its support and rotation about the shaft or axle 115. In some constructions, the stationary idler roller's position on the shaft 115 is fixed, while in others the stationary idler roller 55 is free to move toward or away from the side plates 70. In another construction, the stationary idler roller 55 is supported for rotation by pillow block bearings or any other suitable bearing in much the same manner as the drive roller 40.

The stationary idler roller 55 includes a plurality of grooves 120 sized to engage the plurality of belts 65. The grooves 120 are similar to the grooves 110 of the drive roller 40. Each of the plurality of belts 65 engages and is guided by one of the grooves 120. The stationary idler roller 55 is positioned between the side plates 70 such that the grooves 120 of the stationary idler roller 55 substantially align with the grooves 110 of the drive roller 40. With the grooves 110, 120 aligned, the belts 65 travel in a path that is parallel to the desired path 85 of the stream of signatures 30.

Turning to FIG. 3, an exploded view of the waste gate 20 better illustrates the carriage 60. The carriage 60 includes two carriage side plates 125, six support bearings 130 (three shown), and two guide rails 135 (one shown).

The two carriage side plates 125 are spaced apart from one another to provide a conveyor path therebetween. The two carriage side plates 125 pivotally support the seesaw member 45 and rotatably support the movable idler roller 50. The seesaw member 45 is supported adjacent the inlet end of the carriage 60 and the movable idler roller 50 is positioned near the outlet end of the carriage 60.

The movable idler roller 50 is supported for rotation on a fixed axle 140 that extends between the carriage side plates 125. The movable idler roller 50 includes bearings that facilitate its rotation about the shaft or axle 140. In some of these constructions, the position of the movable idler roller 50 is fixed relative to the carriage side plates 125, while in other constructions the movable idler roller 50 is free to move toward or away from the carriage side plates 125. In yet another construction, the movable idler roller 50 is supported by bearings positioned at either end and attached to the carriage side plates 125. As previously discussed with regard to the drive roller 40, any suitable bearings can be used.

The movable idler roller 50 includes a plurality of grooves 145, with each groove 145 sized and positioned to receive and guide one of the plurality of belts 65. The grooves 145 substantially align with the grooves 120 of the stationary idler roller 55 and the grooves 110 of the drive roller 40 to allow for straight travel of the belts 65 therein.

The guide rails 135 and support bearings 130 cooperate to support the carriage 60 between the frame side plates 70 and allow for its linear motion. Three of the six support bearings 130 attach to the outside of each of the carriage side plates 125 and provide support for the carriage 60. The support bearings 130 can be bearings or wheels that are free to roll about their respective mounting axes. Each of the guide rails 135 attaches to the inner surface of the frame side plates 70 to define tracks on which the support bearings 130 roll. Two of the three support bearings 130 on either side of the carriage 60 roll on the top surface of the guide rails 135, while the third bearing 60 is positioned to roll on the bottom surface of the guide rails 135. This orientation prevents vertical movement of the carriage 60 during operation. The carriage 60 and the frame 35 are sized to prevent excessive lateral or side-to-side movement of the carriage 60 relative to the frame 35. However, the carriage 60 is free to travel in a substantially linear direction between a first position adjacent the waste gate inlet and a second position adjacent the waste gate outlet. The actuator connection maintains the carriage 60 in the desired position and facilitates carriage movement.

Still referring to FIG. 3, the seesaw member 45 shown includes a pivot shaft or support axle 150, two side bars 155, an upper idler roller 160, a lower idler roller 165, and a guide pin 170. The support axle 150 extends between the carriage side plates 125 and is fixedly supported to provide an axis of rotation. In another construction, the support axle 150 is supported by bearings attached at either end to the carriage side plates 125. In this construction, the support axle 150 is free to rotate.

Each of the side bars 155 is a substantially elongated member including a bore near the center. The bore engages the support axle 150 such that the side bars 155 remain free to pivot about the support axle 150. In some constructions, bearings are provided to facilitate the pivoting action. In constructions in which the support axle 150 is supported by bearings, the side bars 155 fixedly attach to the support axle 150 so that they pivot in unison.

The ends of the side bars 155 align with one another to support the upper idler roller 160 and the lower idler roller 165. In some constructions, the side bars 155 support the upper idler roller 160 and the lower idler roller 165 in bearings to facilitate rotation. In other constructions, shafts fixedly attach to the ends of the side bars 155 and define axles 175 on which the upper idler roller 160 and lower idler roller 165 are able to rotate.

The upper idler roller 160 and lower idler roller 165 each include grooves 180 similar to those in the drive roller 110, the stationary idler roller 120, and the movable idler roller 145. The grooves 180 are sized and positioned to engage one of the plurality of belts 65 to guide and align the belts 65 so that they travel along the desired path. The grooves 180 of the upper idler roller 160 and the lower idler roller 165 are aligned with the grooves of the drive roller 110, the grooves of the stationary idler roller 120, and the grooves of the movable idler roller 145, thereby facilitating straight travel of the belts 65 along the desired path 85 of signature travel.

The guide pin 170 is fixedly attached to one of the side bars 155 and is substantially coaxial with the upper idler roller 160. The guide pin 170 extends through a slot 185 in the frame side plate 70. The slot 185 is shaped to guide the upper idler roller 160 along a desired path when the waste gate 20 transitions from a first configuration to a second or waste configuration. The pin 170 includes a roller portion 190 that rolls in the slot 185 to reduce wear. In other constructions, the pin 170 extends through the slot 185 and rides directly on the slot surfaces. In still other constructions, a second pin (shown in FIG. 2) extends in the opposite direction from the opposite side bar 155. The second pin passes through a slot in the opposite frame side plate 70 and further guides the upper idler roller 160.

It should be noted that the guide pin 185 could be located in other positions along the side bars 155 rather than coaxial with the upper idler roller 160. Therefore, the invention is not limited to the guide pin position shown or described herein.

The shape of the slot 185 guides the upper idler roller 160 along a path that allows for the smooth transition between first and second configurations. The slot 185 guides the upper idler roller 160 down and away from the incoming shingled stream of signatures 30. This allows signatures 30 that are partially or totally on the waste gate belts 65 as the transition begins to pass by the waste gate 20. After guiding the upper idler roller 160 down and away, the slot 185 guides the upper idler roller 160 along a substantially linear path away from the input conveyor 15. Likewise, during the return from the waste configuration, the upper idler roller 160 approaches the shingled stream of signatures from slightly below, thereby facilitating a smooth transition.

In addition to the seesaw member 45 and the movable idler roller 50, some constructions of the carriage 60 include additional spacer and attachment members that provide additional rigidity and support to the carriage 60.

Figure 4:
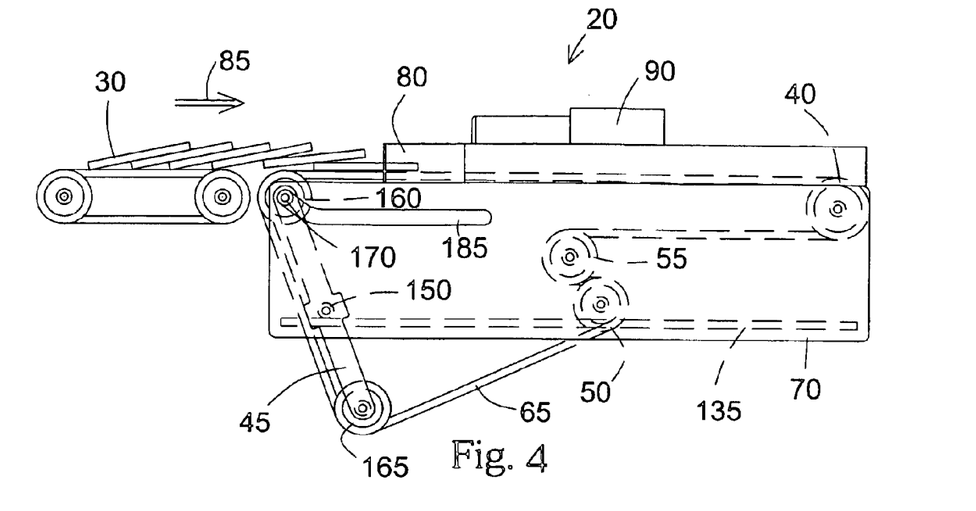
FIG. 4 is a side view of the waste gate of FIG. 1 configured to pass printed products.
Figure 5:
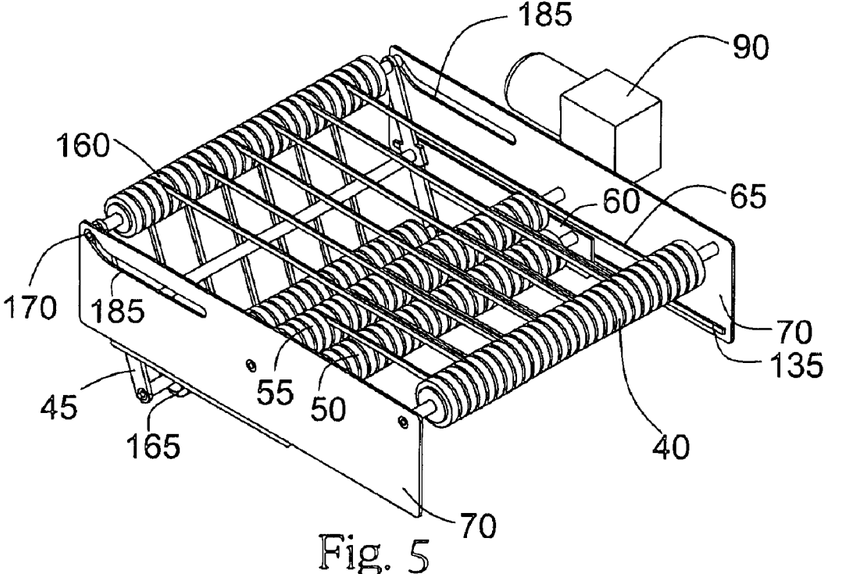
FIG. 5 is a perspective view of the waste gate of FIG. 1 configured as shown in FIG. 4.

Turning now to FIGS. 4–7, the operation of the waste gate 20 will be described. FIGS. 4 and 5 illustrate the waste gate 20 arranged in its first configuration or position. In this configuration, the carriage 60 is in its most forward position and the upper idler roller 160 is in its most elevated forward position. In this position, signatures 30 are able to travel from the input conveyor 15 to the output conveyor 25 via the waste gate 20 as indicated by the arrows. As shown in FIG. 4, the belts 65 each travel from the top of the upper idler roller 160 in a substantially horizontal direction to the drive roller 40. From there, the belts 65 travel around the outlet side of the drive roller 40 and back towards the inlet portion of the waste gate 20 along a substantially horizontal path. The belts 65 continue around the input conveyor side of the stationary idler roller 55 and down toward the movable idler roller 50. The belts 65 then pass around the output conveyor side of the movable idler roller 50. From the movable idler roller 50, the belts 65 travel down and toward the input conveyor 15 where they pass around the input conveyor side of the lower idler roller 165 before returning to and passing around the input conveyor side of the upper idler roller 160. Thus, each of the belts 65 travels along a continuous path having a first path length.

Figure 6:
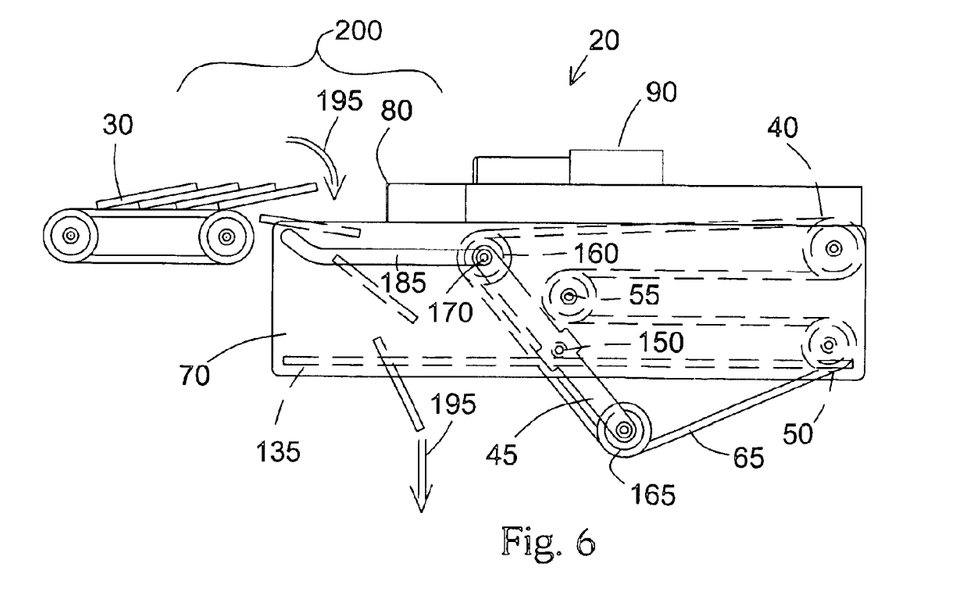
FIG. 6 is a side view of the waste gate of FIG. 1 configured to discharge printed products to waste.
Figure 7:
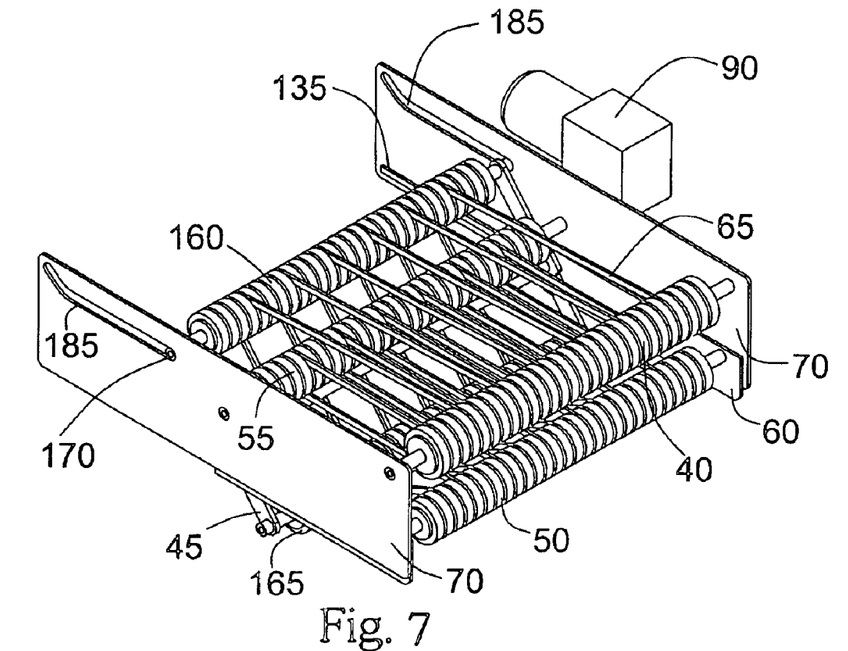
FIG. 7 is a perspective view of the waste gate of FIG. 1 configured as shown in FIG. 6.

Turning now to FIGS. 6–7, the waste gate 20 is shown in its second configuration or position. In this position, the stream of signatures 30 is discharged along a waste path 195 as indicated by the arrows. In this configuration, the carriage 60 is in its most rearward position (near the output conveyor 25) and the upper idler roller 160 is in its lowermost and rearmost position. Furthermore, the movable idler roller 50 that is supported by the carriage 60 also shifts rearward. As shown in FIG. 6, the belts 65 each travel from the top of the upper idler roller 160 to the drive roller 40 along an upwardly inclined path. From there, the belts 65 travel around the outlet side of the drive roller 40 and back towards the inlet portion of the waste gate 20 along a substantially horizontal path. The belts 65 continue around the input conveyor side of the stationary idler roller 55 and toward the movable idler roller 50 along a substantially horizontal path. The belts 65 then pass around the output conveyor side of the movable idler roller 50. From the movable idler roller 50, the belts 65 travel down and toward the input conveyor 15 where they pass around the input conveyor side of the lower idler roller 165 before returning to and passing around the input conveyor side of the upper idler roller 160. Thus, each of the belts 65 travels along a continuous path having a waste path length.

The arrangement just described assures that the waste path length is substantially equal to the first path length. In addition, by moving the movable idler roller 50 in conjunction with the seesaw member 45, the belt paths maintain a substantially constant length throughout the movement. In addition, the seesaw member's ability to pivot accommodates slight variations in length and belt tension during the transition from one configuration to another. Thus, the drive roller 40 maintains a constant speed when the waste gate 20 is arranged in either configuration or during the transition between configurations.

One of ordinary skill in the art will realize that the servomotor 90 acts to move the waste gate 20 between the first configuration and the second configuration. As previously described, another construction uses the inertia of the signatures 30 to reconfigure the waste gate 20. In these constructions, the actuator includes a brake that stops the rotation of one or more rollers to stop the conveyor 65. The sudden stop causes the conveyor 65 to move to the second configuration. In one particular construction rollers 50 and 160 are stopped.

The signatures 30 exiting the input conveyor 15 never reach the waste gate belts 65 when the waste gate 20 is arranged in the second configuration. Instead, the signatures 30 fall through a gap 200 defined between the input conveyor outlet and the upper idler roller 160. A collection device such as a dumpster or recycle bin is preferably positioned beneath the waste gate 20 to catch the product being diverted.

Although the invention has been described in detail with reference to certain preferred embodiments, variations and modifications exist within the scope and spirit of the invention as described and defined in the following claims.

What is claimed is:

1. A gate having an input and an output, the gate selectively passing printed products to one of a first path and a second path, the gate comprising:
    a frame;
    a first roller supported by the frame for rotation about a first axis adjacent the gate output, the first roller fixed with respect to the frame;
    a second roller supported by the frame for rotation about a second axis, the second roller movable with respect to the first roller between a first position adjacent the gate input and a second position; and
    a conveyor belt supported by the first roller and the second roller such that when the second roller is in the first position, the printed products pass along a first path and when the second roller is in the second position, the printed products pass along a second path that diverges from the first path.

2. The gate of claim 1, wherein the frame further includes a guide path, the second roller connected to the guide path such that the second axis is movable along the guide path.

3. The gate of claim 1, wherein the first roller is a drive roller operable to drive the conveyor belt.

4. The gate of claim 1, wherein the conveyor belt includes a plurality of continuous belts.

5. The gate of claim 1, wherein the conveyor belt follows a first path having a first length when the second roller is in the first position and a second path having a second length when the second roller is in the second position, wherein the orientation of the first path is different than that of the second path and the first path length is substantially equal to the second path length.

6. The gate of claim 1, wherein the gate includes an input end and an output end, and wherein, when the second roller is in the first position, the conveyor belt interconnects the input end and the output end such that the printed products pass along the first path from the input end to the output end.

7. The gate of claim 1, wherein the gate includes an input end and an output end and the first roller is disposed adjacent the output end and the second roller is disposed adjacent the input end when in the first position.

8. The gate of claim 7, wherein the second roller is spaced a distance from the input end when in the second position such that the printed products do not contact the conveyor when the second roller is in the second position and instead pass along the second path.

9. The gate of claim 8, wherein the second path is a waste path.

10. The gate of claim 1, further comprising an actuator operable to move the second roller.

11. The gate of claim 10, wherein the actuator includes a pneumatic cylinder.

12. A gate having an input and an output, the gate selectively passing printed products to one of a first path and a second path, the gate comprising:
    a frame;
    a first roller supported by the frame for rotation about a first axis adjacent the gate output, the first roller fixed with respect to the frame;
    a second roller supported by the frame for rotation about a second axis, the second roller movable with respect to the first roller between a first position adjacent the gate input and a second position; and
    a conveyor belt supported by the first roller and the second roller such that when the second roller is in the first position, the printed products pass along a first path and when the second roller is in the second position, the printed products pass along a second path; and
    a pivot member including a movable pivot shaft supported for rotation relative to the frame, a first end supporting the second roller, and a second end supporting a first idler roller.

13. The gate of claim 12, wherein the movable pivot shaft is movable along a substantially linear path between a first shaft position and a second shaft position, and when in the first shaft position, the second roller is in the first position and when in the second shaft position the second roller is in the second position.

14. The gate of claim 13, wherein the second roller and the first idler roller pivot about the movable pivot shaft to maintain tension on the conveyor belt.

15. The gate of claim 12, further comprising a second idler roller and a third idler roller, the conveyor belt interconnected with the first roller, the second roller, the first idler roller, the second idler roller, and the third idler roller.

16. The gate of claim 15, wherein movement of the movable pivot shaft results in a corresponding movement of the second idler roller and when the movable pivot shaft is in the first shaft position the conveyor belt defines a first conveyor belt path having a first path length and when the movable pivot shaft is in the second shaft position the conveyor belt defines a second conveyor belt path having a second path length substantially equal to the first path length.

17. A gate for selectively passing printed products comprising:
    a frame having an input end and an output end;
    a first roller supported for rotation about a first axis, the first roller fixed with respect to the frame and positioned adjacent the output end;
    a second roller supported by the frame for rotation about a second axis, the second roller movable with respect to the first roller between a first position and a second position, the first position being adjacent the input end;
    a conveyor belt connected to both the first roller and the second roller;
    a first product path for guiding the printed products from the input end to the output end, the first product path defined at least partially by the conveyor belt when the second roller is in the first position; and a second product path for guiding the printed products away from the output end, the second product path defined at least partially by a gap between the input end and the second roller when the second roller is in the second position.

18. The gate of claim 17, wherein the second roller is positioned between the input end and the first roller when in the second position.

19. The gate of claim 17, wherein the frame further includes a guide path, the second roller connected to the guide path such that the second roller is movable along the guide path.

20. The gate of claim 17, wherein the first roller is a drive roller operable to drive the conveyor belt.

21. The gate of claim 17, wherein the conveyor belt includes a plurality of continuous belts.

22. The gate of claim 17, wherein the conveyor belt follows a first path having a first length when the second roller is in the first position and a second path having a second length when the second roller is in the second position, wherein the orientation of the first path is different than that of the second path and the first path length is substantially equal to the second path length.

23. The gate of claim 17, wherein when the second roller is in the first position the conveyor belt interconnects the input end and the output end such that the printed products pass along the first product path from the input end to the output end.

24. The gate of claim 17, wherein the first roller is disposed adjacent the output end and the second roller is disposed adjacent the input end when in the first position.

25. The gate of claim 24, wherein the second roller is spaced a distance from the input end when in the second position such that the printed products do not contact the conveyor when the second roller is in the second position and instead pass along the second product path.

26. The gate of claim 17, further comprising an actuator operable to move the second roller between the first position and the second position.

27. The gate of claim 26, wherein the actuator includes a pneumatic cylinder.

28. A gate for selectively passing printed products comprising:
a frame having an input end and an output end;
a first roller supported for rotation about a first axis, the first roller fixed with respect to the frame and positioned adjacent the output end;
a second roller supported by the frame for rotation about a second axis, the second roller movable with respect to the first roller between a first position and a second position, the first position being adjacent the input end;
a conveyor belt connected to both the first roller and the second roller; and
a pivot member including a movable pivot shaft supported for rotation relative to the frame, a first end supporting the second roller, and a second end supporting a first idler roller.

29. The gate of claim 28, wherein the movable pivot shaft is movable along a substantially linear path between a first shaft position and a second shaft position, and when in the first shaft position, the second roller is in the first position and when in the second shaft position the second roller is in the second position.

30. The gate of claim 29, wherein the second roller and the first idler roller pivot about the movable pivot shaft to maintain tension on the conveyor belt.

31. The gate of claim 28, further comprising a second and third idler roller, the conveyor belt interconnected with the first roller, the second roller, the first idler roller, the second idler roller, and the third idler roller.

32. The gate of claim 31, wherein movement of the movable pivot shaft results in a corresponding movement of the second idler roller and when the movable pivot shaft is in the first shaft position the conveyor belt defines a first conveyor belt path having a first path length and when the movable pivot shaft is in the second shaft position the conveyor belt defines a second conveyor belt path having a second path length substantially equal to the first path length.

33. A method of diverting a stream of printed products to a waste path, the method comprising:
positioning a frame between an input conveyor and an output conveyor;
supporting a conveyor belt between a fixed roller and a movable roller, the fixed roller rotatable about an axis that is fixed relative to the frame, the movable roller rotatable about an axis and movable with respect to the first roller between a first position and a second position;
operating the conveyor belt along a first conveyor path;
feeding a stream of printed products from the input conveyor to the conveyor belt and from the conveyor belt to the output conveyor; and
moving the movable roller from the first position to the second position such that the stream of printed products is diverted to a waste path prior to reaching the conveyor belt.

34. The method of claim 33, wherein the frame includes an input end and an output end and wherein the fixed roller is adjacent the output end and the movable roller is adjacent the input end when in the first position and is between the input end and the output end when in the second position.

35. The method of claim 33, wherein the frame includes a guide channel and wherein the movable roller is constrained to move along the guide channel.

36. The method of claim 35, wherein the guide channel is non-linear.

37. The method of claim 33, wherein the first conveyor path has a first path length and wherein when the second roller is in the second position the conveyor belt moves in a second conveyor path having a second path length substantially similar to the first path length.

38. The method of claim 33, wherein the stream of printed products is shingled.

39. A conveyor assembly for selectively passing printed products, the conveyor assembly comprising:
an input conveyor;
an output conveyor spaced from the input conveyor;
a frame positioned between the input conveyor and the output conveyor;
a first roller supported by the frame for rotation about a first axis, the first roller fixed with respect to the frame and positioned adjacent one of the input conveyor and the output conveyor;
a second roller supported by the frame for rotation about a second axis and positioned between the first roller and the other of the input conveyor and the output conveyor, the second roller movable with respect to the first roller between a first position and a second position; and
a conveyor belt connected to both the first roller and the second roller, the conveyor belt cooperating with the input conveyor when the second roller is in the first position to define a first path that conveys the printed products from the input conveyor to the output conveyor, the conveyor belt spaced a distance from the other of the input conveyor and the output conveyor when the second roller is in the second position to define a second path that diverges from the first path.

40. The conveyor assembly of claim 39, further comprising an actuator operable to move the second roller between the first and second positions.

41. The conveyor assembly of claim 39, wherein the first path is substantially linear, and wherein the second path diverges from the first path downstream of the input conveyor and upstream of the second roller.

42. The conveyor assembly of claim 39, wherein when the second roller is in the second position, the second roller and the other of the input conveyor and the output conveyor define a gap through which the printed products fall while moving along the second path.

43. The conveyor assembly of claim 39, further comprising a subframe, wherein the subframe is movably coupled to the frame and the second roller is rotatably supported by the subframe.

44. The conveyor assembly of claim 43, further comprising an idler roller rotatably coupled to the subframe.

* * * * *